(12) United States Patent
Johnson

(10) Patent No.: US 7,748,945 B2
(45) Date of Patent: Jul. 6, 2010

(54) FLOATING SEALING RING

(76) Inventor: Jerry Wayne Johnson, 13 Round Table Rd., Saratoga Springs, NY (US) 12066

( * ) Notice: Subject to any disclaimer, the term of this patent is extended or adjusted under 35 U.S.C. 154(b) by 561 days.

(21) Appl. No.: 11/552,625

(22) Filed: Dec. 7, 2006

(65) Prior Publication Data

US 2008/0136115 A1   Jun. 12, 2008

(51) Int. Cl.
*F01D 11/08* (2006.01)
(52) U.S. Cl. .................. 415/1; 415/12; 415/14; 415/126; 415/136; 415/173.1
(58) Field of Classification Search .......... 415/1, 415/12, 14, 126, 128, 136, 173.1–173.7, 415/174.1, 174.2, 174.4, 174.5; 277/411–413, 277/415, 422, 544, 578, 580, 581
See application file for complete search history.

(56) References Cited

U.S. PATENT DOCUMENTS

| | | | |
|---|---|---|---|
| 1,848,613 A | 3/1932 | Flanders | |
| 2,458,988 A | 1/1949 | Gayer | |
| 3,503,616 A | 3/1970 | Hickey | |
| 3,971,563 A * | 7/1976 | Sugimura | 277/413 |
| 4,057,362 A | 11/1977 | Schwaebel | |
| 4,420,161 A | 12/1983 | Miller | |
| 4,436,311 A | 3/1984 | Brandon | |
| 4,513,975 A | 4/1985 | Hauser et al. | |
| 4,892,287 A | 1/1990 | Weevers | |
| 4,943,069 A * | 7/1990 | Jinnouchi | 277/543 |
| 5,002,288 A * | 3/1991 | Morrison et al. | 415/174.5 |
| 5,029,876 A | 7/1991 | Orlando et al. | |
| 5,064,205 A * | 11/1991 | Whitford | 277/317 |
| 5,080,556 A | 1/1992 | Carreno | |
| 5,161,945 A | 11/1992 | Clevenger et al. | |
| 5,224,714 A * | 7/1993 | Kimura et al. | 277/400 |
| 5,344,160 A * | 9/1994 | Scarlata et al. | 415/168.2 |
| 5,351,971 A | 10/1994 | Short | |
| 5,599,026 A | 2/1997 | Sanders et al. | |
| 5,735,667 A | 4/1998 | Sanders et al. | |
| 6,145,844 A * | 11/2000 | Waggott | 277/412 |
| 6,250,641 B1 | 6/2001 | Dinc et al. | |
| 6,746,019 B1 | 6/2004 | Liebenberg et al. | |
| 6,786,487 B2 * | 9/2004 | Dinc et al. | 277/355 |
| 7,052,017 B2 * | 5/2006 | Uchida et al. | 415/174.5 |

* cited by examiner

*Primary Examiner*—Igor Kershteyn
(74) *Attorney, Agent, or Firm*—GFD Patents LLC; Gerald F. Dudding

(57) ABSTRACT

An apparatus for sealing a turbine against leakage of a working fluid comprising at least one radially displaceable sealing ring, coaxially disposed about a rotating member of the turbine from a stationary member of the turbine, which sealing ring undergoes radial displacements that are coupled to radial displacements of the rotating member, such that a design radial clearance is substantially maintained without damage to the apparatus.

140 Claims, 10 Drawing Sheets

FLOATING SEALING RING

1. BACKGROUND OF THE INVENTION

1.1 Technical Field

The invention pertains to devices that seal against leakage of a working fluid between a stationary member and a rotating member of a turbine.

2. RELATED ART

2.1 Turbine Efficiency

A turbine is a machine for which the present invention provides a seal. The efficiency of a turbine depends upon its ability to maximize the conversion of thermal and kinetic energy carried by a working fluid, such as, for example, steam, into rotational energy of a rotating member that is housed in a stationary member. In steam turbines, a major loss in the efficiency of energy conversion occurs, for example, where leakage of steam bypasses (escapes) blades of the rotating member, and therefore imparts no energy to them. Leakage losses have been of concern for many years. However, with increasing fossil fuel costs and shrinking fossil fuel reserves, this concern is becoming paramount.

2.2 Sealing Devices

To address this concern, sealing devices, comprising non-contacting sealing rings that are deployed serially and coaxially along the length of a turbine's rotating member, provide sealing against excessive leakage of working fluid (e.g., steam) out of, or air into, the turbine, at all loads and under all steam conditions.

The sealing devices used in a turbine are designed to remain stationary while operating in close proximity to a rotating member. Typically such sealing devices are secured within complementary slots for their receipt ("slots"), fabricated into the stationary member of the turbine, to prevent their displacement relative to the rotating member. The efficiency of such sealing devices is directly related to their ability to prevent or reduce leakage of the working fluid.

Depending on their features, the sealing devices used, for example, in turbines, may be known as pressure packings, diaphragm packings, steam packings, steam seals, labyrinth seals, dummy rings, and gland seals.

2.3 Sealing Rings

As indicated, supra, a component of such sealing devices is a non-contacting sealing ring. As its name implies, a sealing ring is a ring-shaped structure that may be comprised of several circumferentially linked arcuate ring segments.

These sealing rings extend radially inward from the slots in the turbine's stationary member (into which they are fixed) in close proximity to the outermost rotating surface of the turbine's rotating member, leaving only a small radial clearance between the innermost aspect of each sealing ring and the outermost rotating surface of the rotating member.

The efficiency of these sealing rings is directly related to their ability to seal various sections of the rotating member by preventing or reducing leakage of the working fluid. For example, in a turbine, these sealing rings maintain the turbine's efficiency by preventing steam from escaping from the turbine and also preventing air from leaking into the turbine.

The related art of sealing rings in the setting of turbines is best understood by reference to FIG. 1A, which shows a partial longitudinal sectional view of an exemplary prior art "labyrinth" sealing ring 210 coaxially disposed about a rotating member 122 of an exemplary turbine; and by reference to FIG. 1B, which shows a corresponding axial cross-sectional view of the exemplary prior art "labyrinth" sealing ring 210 coaxially disposed about a rotating member 122 of an exemplary turbine. A prior art sealing device may be comprised of a plurality of such sealing rings, serially disposed along the longitudinal Z axis of rotating member 122. Exemplary prior art sealing ring 210 may be comprised of two or more sealing ring segments, as shown in FIG. 1B. When linked circumferentially, as shown in FIG. 1B, the sealing ring segments form a complete sealing ring.

Exemplary prior art sealing ring 210 circumscribes rotating member 122, occupying a space between rotating member 122 and stationary member 110 of the turbine (FIG. 1A), to minimize fluid leakage between different regions through which rotating member 122 passes. While the full extent and full features of rotating member 122 are not illustrated, it will be understood that rotating member 122 is a portion of a complete rotating member inclusive of all means for extracting rotary energy from the thermal and kinetic energy of a working fluid, represented by arrows 101 in FIG. 1A.

As shown in FIG. 1A, exemplary prior art sealing ring 210 has a cross-sectional shape generally in the form of an "H," and may conveniently be divided into a radially inner ring portion ("body") 210B, a radially outer ring portion ("dove tail") 210D, and a middle portion ("neck") 210N.

Dove tail 210D is received by slot 112 in stationery member 110. One or more radially-oriented springs 113, housed within the outermost aspect of slot 112 above dove tail 210D push exemplary prior art sealing ring 210 radially inward toward rotating member 122, and also allows for some radial expansion or displacement of exemplary prior art sealing ring 210 away from rotating member 122.

By convention in the art, the term "upstream" refers to a relatively higher pressure region of the working fluid; and, the term "downstream" refers to a relatively lower pressure region working fluid flow. In FIG. 1A and other figures showing longitudinal sections, upstream is generally to the left, and downstream is generally to the right.

Upstream shoulder 114 and opposing downstream shoulder 115 of slot 112 limit the inward radial travel of dove tail 210D to a fixed radial clearance RC. Upstream shoulder 114 has upstream lateral surface 114$n$ and downstream shoulder 115 has opposing downstream lateral surface 115$n$. Upstream lateral surface 114$n$ and downstream lateral surface 115$n$ limit the axial travel of neck 210N.

Operationally, exemplary prior art sealing ring 210 serves to contain most of the working fluid that would otherwise escape through the spaces between rotating member 122 and surrounding stationery member 110 of the turbine.

In FIG. 1A, body 210B of prior art sealing ring 210 has a throttling portion comprising a plurality of exemplary throttling elements 225 such as, for example, teeth, knife-edged teeth, strips, or sealing strips, known in the art. Throttling elements 225 may be etched in, extruded from, affixed to, or otherwise established on body 210B and are coextensive with body 210B. Throttling elements 225 extend radially inward from body 210B toward an outer surface 126 of rotating member 122. Throttling elements 225 may have different lengths, ranging between a shortest throttling element, such as throttling element 225S and a longest throttling element, such as throttling element 225L.

The radial clearance RC between throttling elements 225 and outer surface 126 of rotating member 122 is defined as the linear distance between the tip of the longest throttling element, such as, for example, throttling element 225L and the outer surface 126 of rotating member 122.

As shown in FIG. 1A, some throttling elements 225 of exemplary prior art sealing ring 210 are correspondingly mounted opposite exemplary raised lands 130 and 132 on outer surface 126 of rotating member 122 to improve the sealing effectiveness of exemplary prior art sealing ring 210. Exemplary throttling elements 225 are not in contact with surface 126 of rotating member 122 but extend to within very close proximity thereof, providing a seal against steam flow.

Annular chambers 134 may be defined between individual throttling elements. In operation, throttling elements 225 serve to contain most of the working fluid that would otherwise escape through the space between rotating member 122 and the stationary member 110 of the turbine which surrounds it. The channel formed by each throttling element against the outer surface 126 of the rotating member 122 results in a constriction through which the working fluid must pass.

Working fluid 101 passing through such a constriction undergoes a throttling effect that creates a fluid motion having both axial and radial components, and is accompanied by a reduction in the pressure of the working fluid. In the majority of prior art sealing devices, multiple constrictions are produced by arraying sealing rings, such as exemplary prior art sealing ring 210, against one another in series to form sets of sealing rings. This arrangement causes successive throttling of the working fluid 101, each of which is accompanied by a reduction in the pressure of the working fluid.

However, each successive constriction produces successively less pressure reduction. Consequently, multi-throttled sealing devices cannot completely eliminate leakage of the working fluid. Moreover, the number of throttling elements which are feasible in a particular design may be limited by factors, such as the amount of available axial space along which teeth may be arrayed.

All rotating members of turbines operate with some radial amplitude displacement, i.e., vibration. This means that the rotating member is vibrating with an amplitude on each side of its central longitudinal axis at a given phase angle. Conventional sealing rings cannot adjust their radial position during operation. Any contact between the rotating member and the sealing ring's throttling elements eventuates in elevated levels of vibration in the sealing ring, permanent damage to the throttling elements, and possible damage to the rotating member. In order to prevent contact, conventional sealing rings must rely on a relatively large radial clearance and having a correct internal alignment, which is very difficult to achieve.

One of the main problems with current seal designs is that their effectiveness is dependent on maintaining precise radial alignments with the rotating member throughout the operation of a turbine. If the radial alignment is off by a small amount, contacts ("rubs") between the throttling elements 225 and the rotating member 122 can occur, resulting in damage to the seals and loss of energy conversion efficiency. The only way to correct the loss in efficiency is to replace the damaged seals. However, power providers are operating turbines for 7 to 12 years between replacement overhauls, which means efficiency losses could be severe and very costly for the power providers.

Because maximum sealing efficiency is achieved with a minimum radial clearance, the precise maintenance of a sealing ring's radial alignment requires the maintenance of a minimum feasible radial clearance RC. Rubs will wear the throttling elements, decreasing the sealing efficiency of prior art exemplary sealing ring 210 by creating an unwanted increase in RC. A rub is most likely to occur as a result of transient conditions in a turbine's operation, during which rotating member 122 may be displaced from its normal position relative to prior art sealing ring 210. Displacement often coincides with the starting or stopping of the turbine, load rejections, or overspeeds. It is therefore desirable to prevent rubs.

Various attempts have been made to minimize or eliminate contact between throttling elements 225 and rotating member 122 to avoid wearing down of the throttling elements and decreasing the efficiency of a sealing ring. For example, U.S. Pat. No. 5,599,026 to Sanders, et al., discloses the use of rubbing strips in conjunction with the throttling elements of a sealing ring to prevent contact between the throttling elements and a rotating member with respect to which the throttling elements form a seal.

FIG. 2 is a partial longitudinal sectional view of a labyrinth sealing device having rubbing strips disposed about a rotating member of a turbine. As shown in FIG. 2, rubbing strips 232 comprises strips of material oriented in parallel with the throttling elements 225 of sealing ring 210, and which have a clearance RCR with respect to the rotating member 122 that is less than the radial clearance RC. Consequently, rubbing strips 232 are the first component of sealing ring 210 to make contact with rotating member 122 if conditions cause rotating member 122 to be displaced from its normal position relative to the sealing ring 210.

Accordingly, rubbing strips protect throttling elements 225 and maintain the radial clearance RC until they are worn down, at which point any additional rubs will wear down the throttling elements, with an undesirable increase in the radial clearance RC.

Another structural modification that may decrease the leakage of working fluid is to variably angle throttling elements in the form of teeth that oppose the general direction of leakage flow. Such angled throttling elements are non-perpendicular (i.e., angled) with respect to the central longitudinal axis Z of rotating member 122. This is sometimes referred to as a "herringbone" structure, and has been adapted for use at the periphery of a blade row or its encircling band, as illustrated in U.S. Pat. No. 3,897,169 to Fowler.

Yet another structural modification that may decrease the leakage of working fluid is to incorporate one or more vortex producing and shedding structures in a sealing ring. A vortex shedding tip seal lowers the pressure drop across throttling elements and reduces the quantity of steam which leaks past them, as exemplified in U.S. Pat. No. 5,735,667 to Sanders, et al.

3.1 Summary of the Problem in the Prior Art

As indicated, supra, the radial clearance RC that separates the outer surface of a turbine's rotating member from the innermost edges of the longest throttling elements of a conventional sealing ring is provided to prevent contact between them.

The control of the leakage losses in a turbine represents a considerable financial saving that can be achieved by the maintenance of the actual radial clearance of a sealing ring at, or close to, its original, factory-specified, design or otherwise specified value ("design radial clearance").

Maintaining the radial clearance at, or close to, the design radial clearance requires minimizing any increases of the radial clearance arising from rubs. In the case of a steam turbine, the efficiency of known sealing rings depends significantly on maintaining a narrowest radial clearance between their throttling elements and the turbine's rotating member. The radial clearance provides a space into which working fluid leaks. Over time, as the throttling elements undergo operational wear, the leakage rate into the radial clearance space increases with an attendant decrease in the energy conversion efficiency of the turbine. If an operational excursion should occur and the rotating member comes into contact with the throttling elements, they will be damaged and the working fluid's leakage rate will undergo an undesirable increase.

Presently, the efficiency of known sealing rings has reached an undesirable plateau. Heretofore, modifications to known sealing rings have delivered only incremental improvements in sealing efficiency, which improvements endure only for small amounts of time relative to the operational life of a steam turbine. In effect, sealing rings employing a rubbing strip temporarily transfer the risk and effect of contact with the rotating member from the throttling elements to the rubbing strip. Once the rubbing strip has been worn down by successive contacts with the rotating member, further contacts involve the throttling elements, completely effacing the gain in efficiency provided by the rubbing strip.

Accordingly, there is a need for a sealing ring whose sealing efficiency is not degraded by its very operation and whose sealing efficiency is substantially co-extensive with the operational life of a steam turbine.

3.0 SUMMARY OF THE INVENTION

3.1 Solution of the Problem by the Present Invention

The present invention satisfies the foregoing need by providing a floating sealing ring that effectively hovers at its design radial clearance, no matter what radial displacements may transiently arise in the rotating member. That is, the present invention provides a sealing ring whose actual radial displacements are coupled to the radial displacements of the rotating member it circumscribes, such that, co-extensively with the operational life of a steam turbine, the actual radial clearance is maintained at the design radial clearance of the floating sealing ring.

If the rotating member of a turbine, changes its radial position relative to the floating sealing ring of the present invention, at least one sensing device contacts the rotating member and transmits the radial component of the force of contact through the floating sealing ring to a set of suspension devices, which, co-extensively with the operational life of a steam turbine, maintain the floating sealing ring at its design radial clearance, without damage to the floating sealing ring's throttling elements.

A much narrower radial clearance can be maintained with the floating sealing ring of the present invention and, unlike conventional sealing rings, its internal alignment in the turbine is not critical to assure proper sealing of the steam path.

Accordingly, it is an objective of the present invention:

1) to provide a floating sealing ring, a floating sealing ring segment, and an apparatus comprising more than one floating sealing ring, whose radial clearance is substantially maintained at its design radial clearance during any radial displacement of the rotating member for which it provides a seal;
2) to provide a floating sealing ring, a floating sealing ring segment, and an apparatus comprising more than one floating sealing ring, that eliminates the need for the dove tail found on a conventional sealing ring. Eliminating the dovetail 210D (FIGS. 1A, 1B & 2) that overrides the shoulders 114, 115 (FIGS. 1A & 2) of slot 112 (FIGS. 1A & 2) allows the sealing ring 210 to freely seek any radial position. By contrast, the dovetail on conventional sealing rings acts as a fixed radial positioning device, establishing a fixed radial clearance between the rotating member and the sealing ring for which no adjustment is possible after the turbine is closed for operation. If the radial alignment between the rotating member and the stationary sealing device deviates by only a small amount (e.g., 0.010 inch) the rotating member and the stationary sealing device will rub against each other causing a permanent loss of efficiency and possible damage to the rotating member, depending on the intensity and duration of the rub.
3) to provide a floating sealing ring, a floating sealing ring segment, and an apparatus comprising more than one floating sealing, for sealing a turbine against leakage of a working fluid, the floating sealing ring or segment being coaxially disposed about a rotating member of the turbine from a stationary member of the turbine, which sealing ring or segment undergoes radial displacements that are coupled to radial displacements of the rotating member, such that a design radial clearance is substantially maintained without damage to the apparatus;
4) to provide a floating sealing ring, a floating sealing ring segment, and an apparatus comprising more than one floating sealing ring, for sealing a turbine against leakage of a working fluid, the sealing ring or segment being slideably disposed in a slot of a stationary member of the turbine, the sealing ring or segment comprising a body having throttling elements, a head, and at least one sensing device coupled to at least one set of suspension devices, wherein, co-extensively with the operational life of a steam turbine, the set of suspension devices suspends the sealing ring or segment coaxially about the rotatable member of the turbine at a design radial clearance and maintains the sealing ring or segment at the design radial clearance without damage to the throttling elements, whenever the sensing device contacts the rotating member;
5) to provide a method for producing a floating sealing ring or segment comprising:
   a) providing a sealing ring or segment comprising a head and a body having throttling elements extending radially therefrom;
   b) providing at least one set of suspension devices that suspend the sealing ring or segment at a design radial clearance;
   c) disposing the sensing device among the throttling elements;
   d) coupling the sensing device to the set of suspension devices such that the set of suspension devices maintains the sealing ring or segment at the design radial clearance without damage to the throttling elements, whenever the sensing device contacts the rotating member;
6) to provide method for sealing a turbine having a rotating member and a stationary member against leakage of a working fluid comprising:
   a) defining a central longitudinal axis about which the rotating member rotates;
   b) defining a design radial clearance between a longest throttling element of a sealing ring and an outer surface of the rotating member;
   c) coaxially suspending the floating sealing ring from the stationary member at the design radial clearance by means of at least one set of suspension devices of the sealing ring, which set of suspension devices is coupled to at least one sensing device of the sealing ring;

d) substantially maintaining the sealing ring at the design radial clearance without damage to any of its throttling elements, whenever the sensing device contacts the rotating member.

4.0 BRIEF DESCRIPTION OF THE DRAWINGS

5.0 DETAILED DESCRIPTION OF THE INVENTION

Before the present invention is described, it is to be understood that this invention is not limited to the particular embodiments described, as these may, of course, vary. It is also to be understood that the terminology used herein is for the purpose of describing particular embodiments only, and is not intended to be limiting, because the scope of the present invention will be limited only by the appended claims.

As used herein:

a) the term "radial clearance" is defined as the distance between the outer surface of a turbine's rotating member and the innermost edge of the longest throttling element of a sealing ring;

b) the term "actual radial clearance" means the instantaneous, moment-to-moment or operational distance between the outer surface of a turbine's rotating member and the innermost edge of the longest throttling element of a sealing ring;

c) the term "design radial clearance" means an original, factory-specified, design, preferred or otherwise specified value of the radial clearance;

d) The term "coupled" when referring to the relationship between a suspension device and a sensing device means that the suspension device is in communication with and responsive to forces or signals generated, transmitted or relayed by the sensing device;

e) The term "coupled" when referring to the relationship between a floating sealing ring or a segment or array thereof and a rotating member means that the floating sealing ring or a segment or array thereof undergoes a radial displacement substantially concomitant with and substantially in response to a radial displacement of the rotating member.

f) As used herein and in the appended claims, the singular forms "a", "an", and "the" include plural referents unless the context clearly dictates otherwise. Thus, for example, reference to "a rubbing strip" includes a plurality of such rubbing strips, and so forth.

Figure 3:
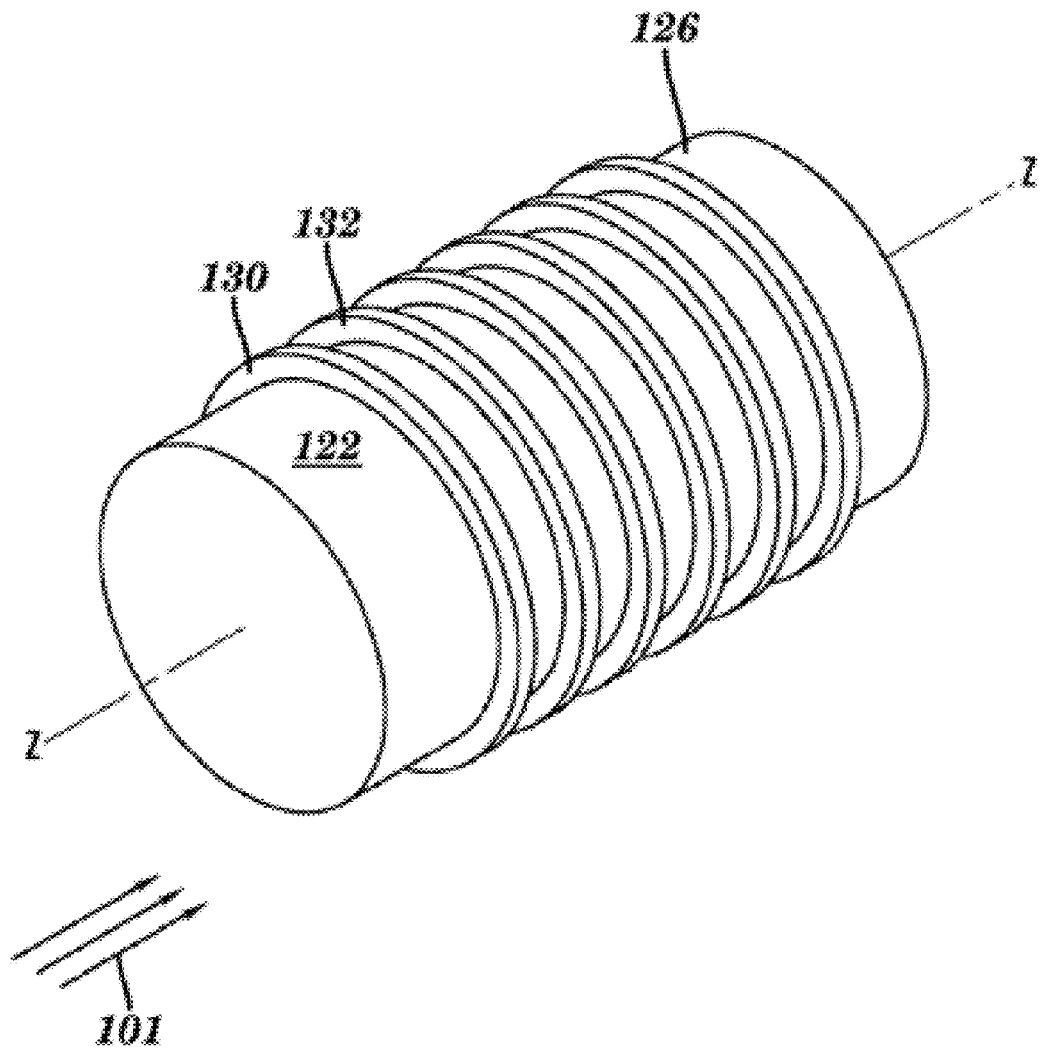
FIG. 3 is a perspective schematic drawing of an exemplary rotating member of a machine, such as, for example, a turbine.

FIG. 3 is a perspective schematic drawing of an exemplary rotating member of a turbine. In FIG. 3, rotating member 122, having outer surface 126 and raised lands 130, 132, is disposed along central longitudinal axis Z, which is generally parallel to working fluid flow vectors, represented by arrows 101.

Figure 4:
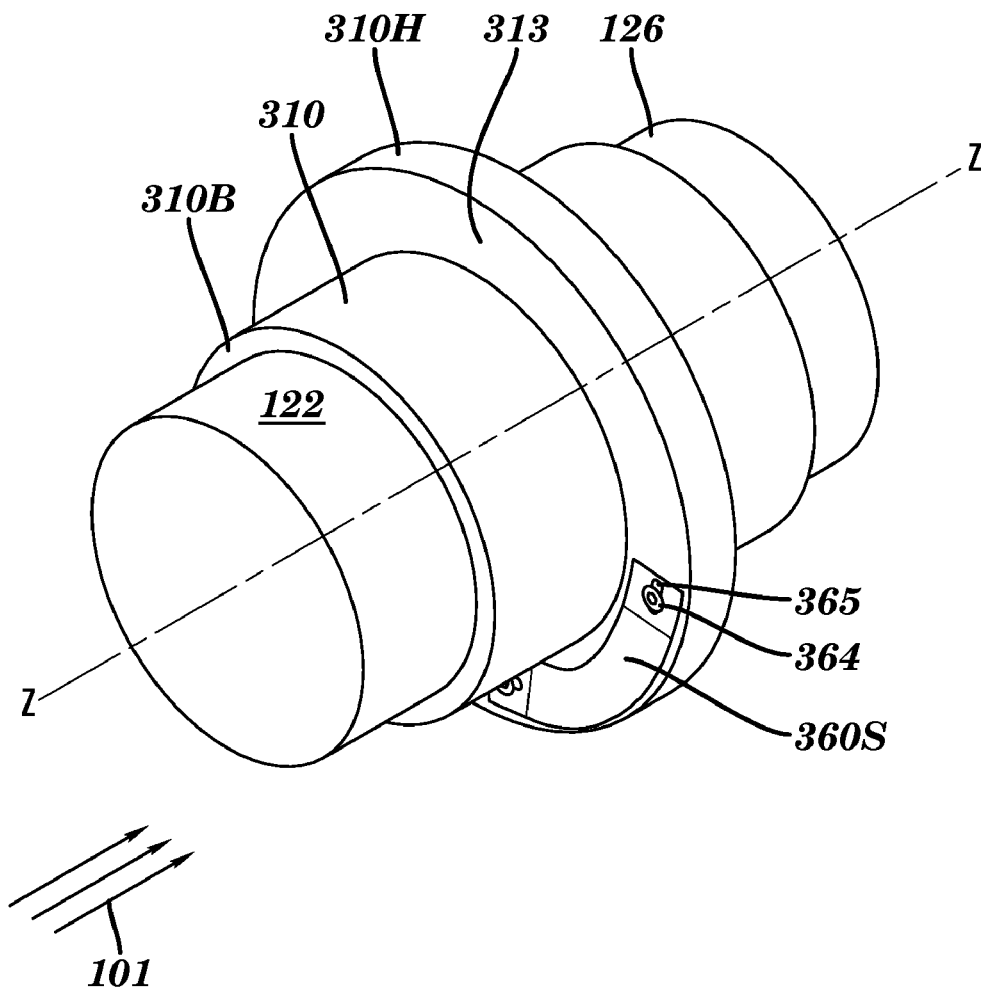
FIG. 4 is a perspective schematic drawing of the exemplary rotating member of FIG. 3 circumscribed by the floating sealing ring of the present invention.

FIG. 4 is a perspective schematic drawing of the exemplary rotating member 122 of FIG. 3 circumscribed by a floating sealing ring 310 of the present invention. In FIG. 4 body (inner ring portion) 310B and upstream aspect of head (outer ring portion) 310H of floating sealing ring 310 are visible.

FIG. 4 shows one exemplary suspension device in the form of a leaf spring 360S. Leaf spring 360S is a member of a set of one or more exemplary suspension devices, in the form of leaf springs, circumferentially secured about upstream lateral wall 313 of head 310H by exemplary paired retainer bolts 364 passing through exemplary suspension spring maintenance slots 365.

Figure 5:
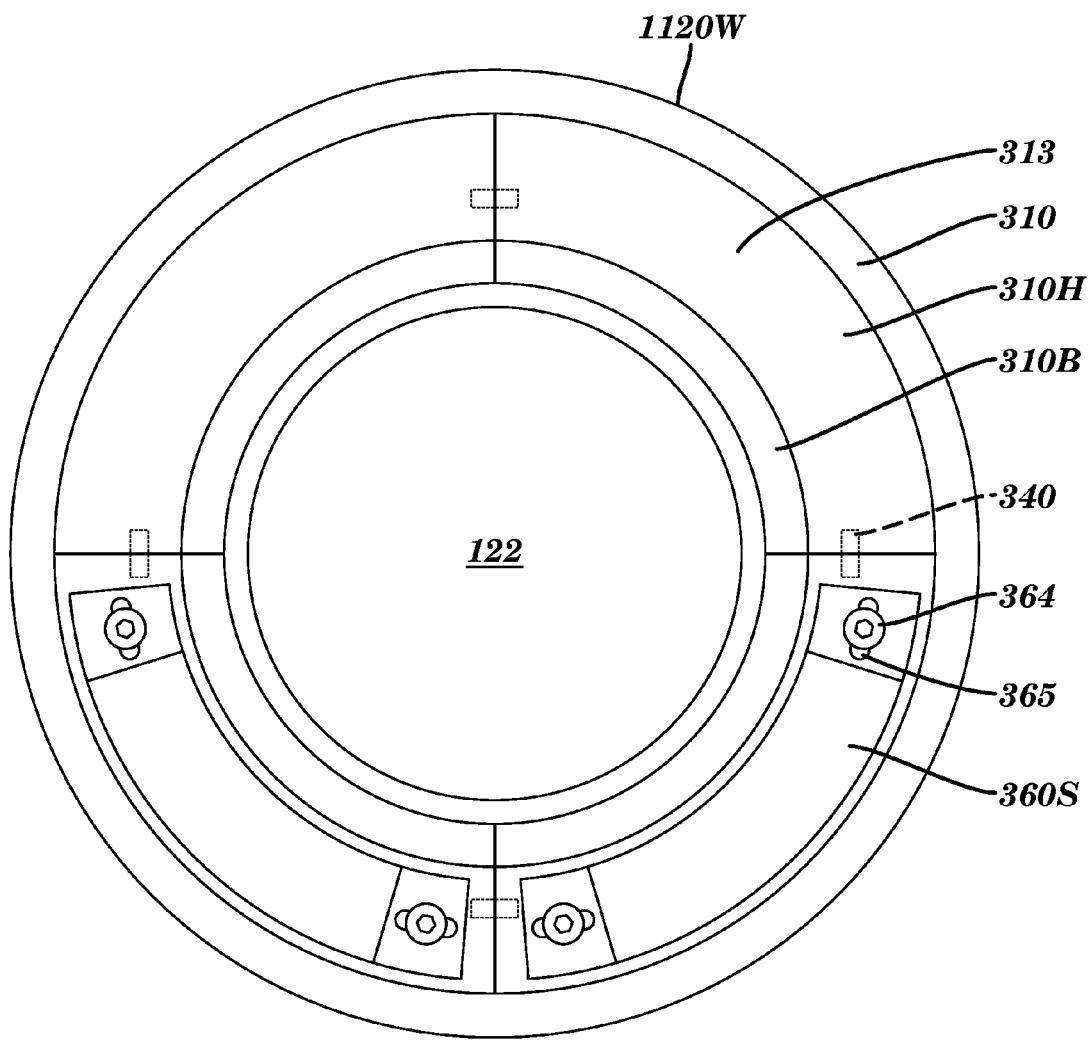
FIG. 5 is an axial cross-sectional view of the floating sealing ring of the present invention showing an exemplary embodiment of a suspension device.

FIG. 5 is an axial cross-sectional view of the floating sealing ring 310 of the present invention showing another view of an exemplary embodiment of a suspension device in the form of a leaf spring 360S.

In FIG. 5, exemplary floating sealing ring is comprised of two exemplary semicircular floating sealing ring segments, aligned by means of fastening devices, such as, for example, suitable pins or bolts (not shown in FIG. 5) disposed in one or more sets of paired alignment holes 340 drilled into complementary positions on the apposing faces of the sealing ring segments. The rigid attachment of the floating sealing ring segments to one another assures that the resultant floating sealing ring behaves mechanically as a continuous uninterrupted unit. A floating sealing ring may be comprised of more than two floating sealing ring segments.

Leaf spring 360S is a member of a set of one or more leaf springs, circumferentially secured about head 310H by exemplary paired retainer bolts 364 passing through exemplary suspension spring maintenance slots 365. Two such leaf springs 360S are shown mounted on the upstream lateral wall 313 of head 310H (FIG. 4).

Figure 6A:
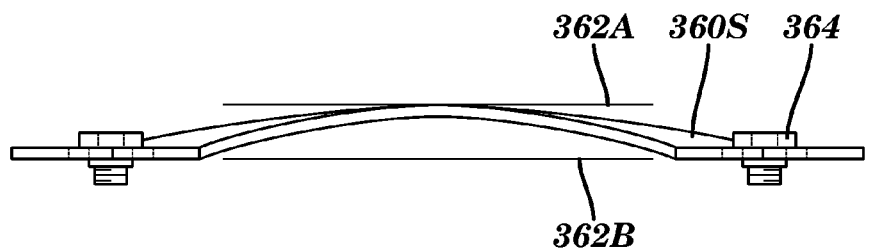
FIG. 6A is an elevated longitudinal view of an exemplary leaf spring forming a suspension device of the floating sealing ring of the present invention.
Figure 6B:
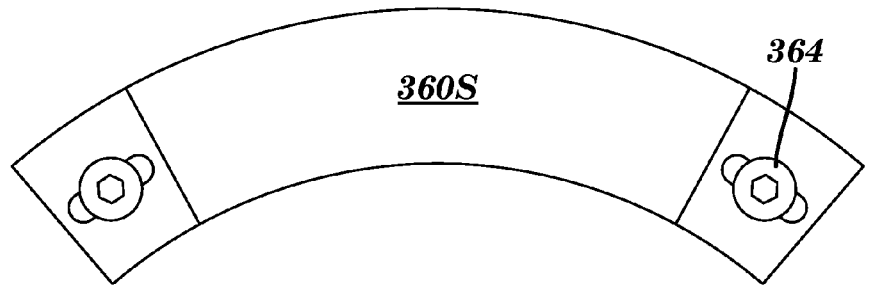
FIG. 6B is top plan view of an exemplary leaf spring forming a suspension device of the floating sealing ring of the present invention.

FIG. 6A is an elevated longitudinal view of an exemplary leaf spring forming a suspension device of the floating sealing ring of the present invention. FIG. 6B is top plan view of an exemplary leaf spring forming a suspension device of the floating sealing ring of the present invention.

In FIG. 6A, leaf spring 360S is seen to have a first force-transmitting surface 362A and an opposing parallel second force-transmitting surface 362B. First force-transmitting surface 362A and opposing parallel second force-transmitting surface 362B may be physical or virtual. First force-transmitting surface 362A and opposing parallel second force-transmitting surface 362B transmit opposing antiparallel forces generated by leaf spring 360S or an alternative suspension device, as more fully discussed, infra.

In FIG. 6A, first force-transmitting surface 362A and second force-transmitting surface 362B are parallel surfaces on opposing aspects of leaf spring 360S, which is representative of a suspension device and is a member of a set of suspension devices. Accordingly, it is to be understood that first force-transmitting surface 362A and second force-transmitting surface 362B are also representative of physical or virtual parallel surfaces on opposing aspects of a set of suspension devices.

As indicated supra, floating sealing ring 310 may be comprised of a single unit that circumscribes rotating member 122 or it may be comprised of a plurality of arcuate segments, such as, for example, four arcuate segments, each spanning 90 degrees, such that when the segments are mechanically joined end-to-end, the segments form a complete floating sealing ring spanning 360 degrees about rotating member 122.

Figure 7:
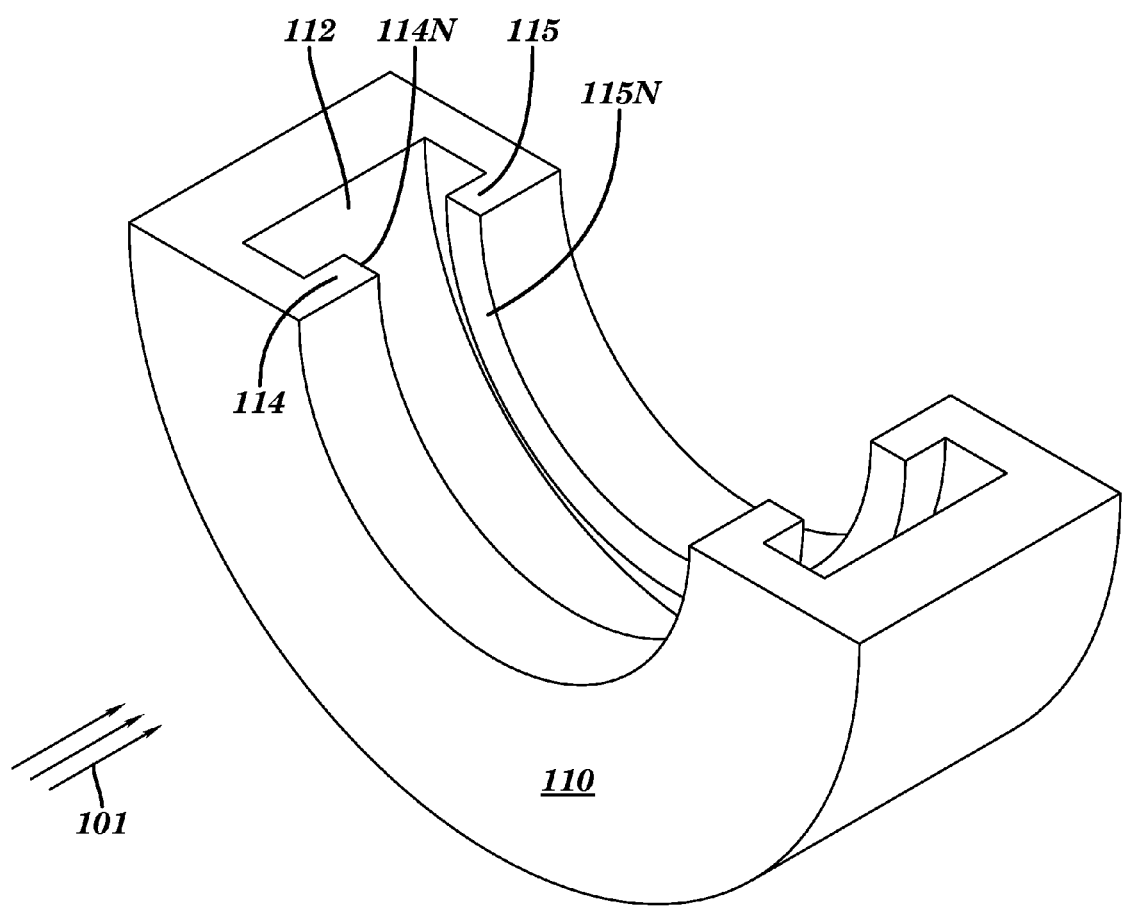
FIG. 7 is a perspective schematic drawing of a semicircular portion of the stationary member of a turbine, having a slot for the receipt of the floating sealing ring of the present invention.

FIG. 7 is a perspective schematic drawing of a semicircular portion of stationary member 110 of a turbine, having a slot 112 for the receipt of the floating sealing ring (not shown in FIG. 7) of the present invention. Slot 112 in stationery member 110 has upstream shoulder 114 and opposing downstream shoulder 115. Upstream shoulder 114 has upstream lateral surface 114n and downstream shoulder 115 has opposing downstream lateral surface 115n.

Figure 8:
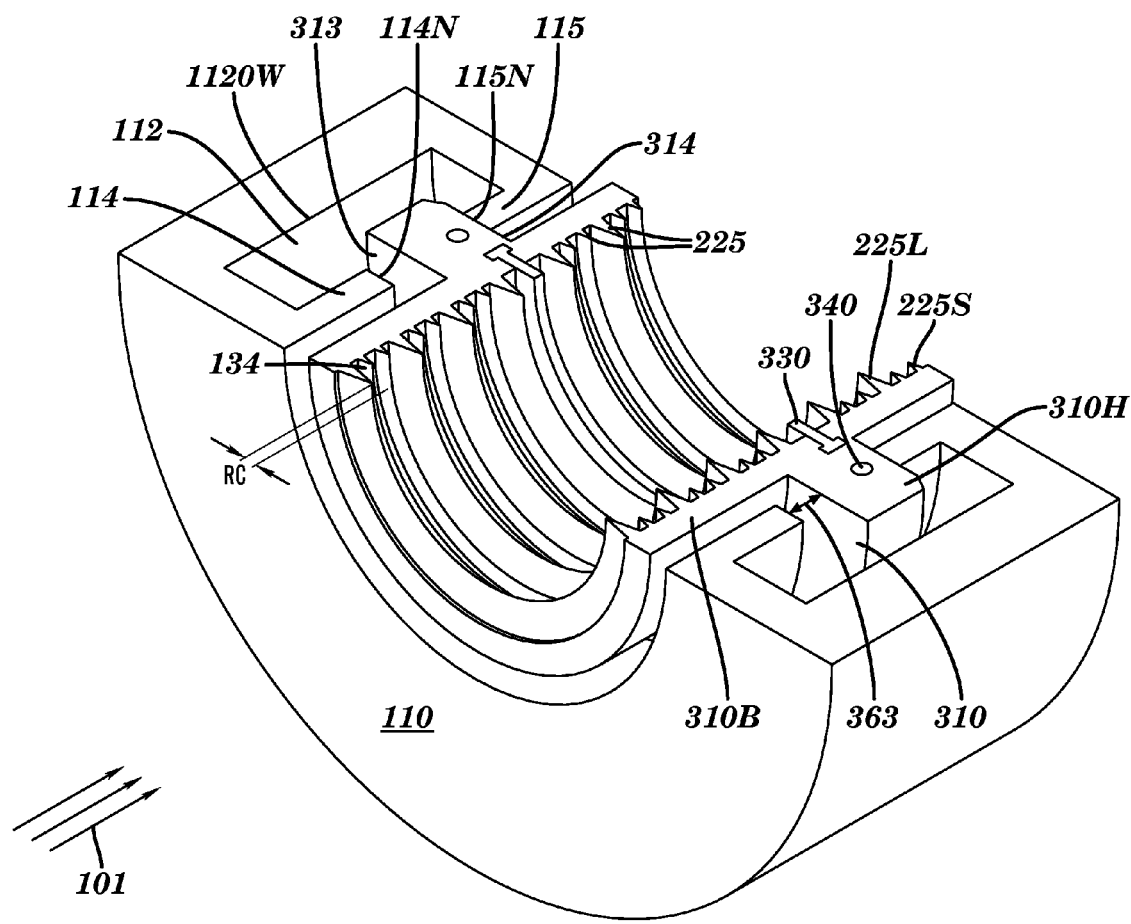
FIG. 8 is a perspective schematic drawing of a semicircular portion of the stationary member of a turbine, showing the disposition of a semicircular portion of the floating sealing ring of the present invention in a slot for its receipt.

FIG. 8 is a perspective schematic drawing of a semicircular portion of the stationary member 110 of a turbine, showing an inferior semicircular segment of floating sealing ring 310 of the present invention in greater detail. Floating sealing ring 310 is seen to be disposed in slot 112.

In FIG. 8, body 310B of floating sealing ring 310 has a throttling portion comprising a plurality of exemplary throttling elements 225 such as, for example, teeth, knife-edged teeth, strips, or sealing strips, known in the art. Throttling elements 225 may be etched in, extruded from, affixed to, or otherwise established on body 310B and are circumferentially coextensive with body 310B. Annular chambers 134 may be defined between individual throttling elements.

In FIG. 8, sensing device 330 is disposed among throttling elements 225, and will be discussed in greater detail, infra. In FIG. 8, exemplary alignment hole 340 (representative of a set comprising at least one alignment hole) provides alignment among arcuate segments, discussed, supra, in those cases where floating sealing ring 310 is comprised of such segments. For example, in FIG. 8, floating sealing ring 310 would be comprised of two 180 degree arcuate segments. A fastening device, such as a bolt or pin, is placed in exemplary alignment hole 340 to physically join one floating ring segment to another in forming a complete, substantially rigid sealing ring. An advantage to using a sealing ring that is mechanically joined is the elimination of leakage between segment interfaces that may arise in conventional sealing rings.

The radial clearance RC between throttling elements 225 and outer surface 126 of rotating member 122 is defined as the linear distance between the longest throttling element, such as, for example, throttling element 225L and the outer surface 126 (FIG. 3) of rotating member 122 (FIG. 3). Floating sealing ring 310 is installed at a design radial clearance appropriate to the turbine for which is being deployed.

Exemplary throttling elements 225 are not in contact with surface 126 (FIG. 3) of rotating member 122 (FIG. 3) but extend to within very close thereof, to maintain the clearance RC between the surface of rotating member 122 and the longest throttling elements 225L, providing an effective seal against steam flow.

In FIG. 8, head 310H of floating sealing ring 310 has upstream lateral wall 313 and downstream lateral wall 314. For purposes of clarity, suspension device 360S of the set of suspension devices shown in FIG. 4 is not shown in FIG. 8. However, double-headed arrow 363 shows the antiparallel force vectors that are transmitted by any member of the set of suspension devices (FIG. 4) to upstream lateral surface 114n of upstream shoulder 114 and downstream lateral surface 115n of downstream shoulder 114 of slot 112.

Figure 9:
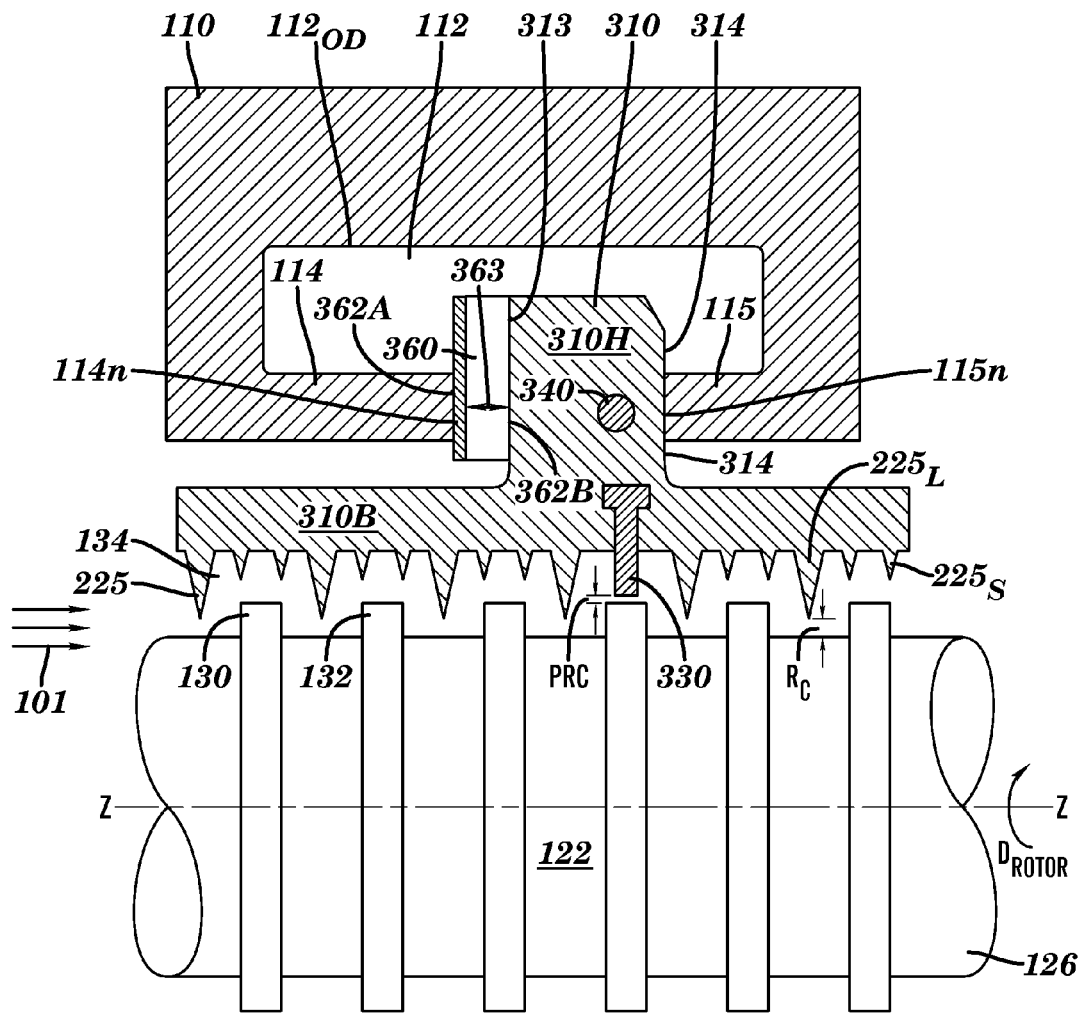
FIG. 9 is a partial longitudinal sectional view of the floating sealing ring of the present invention disposed about a rotating member of an exemplary turbine.

FIG. 9 is a partial longitudinal sectional view of the floating sealing ring 310 of the present invention disposed about a rotating member 122 of a turbine. Floating sealing device 310 may be comprised of a plurality of such floating sealing rings, disposed axially along rotating member 122.

Floating sealing ring 310 circumscribes rotating member 122, occupying a space between rotating member 122 and stationary member 110 of a turbine (not shown in FIG. 9), to minimize fluid leakage between different regions through which rotating member 122 passes. While the full extent and full features of rotating member 122 are not illustrated, it will be understood that rotating member 122 is a portion of a complete rotating member of a turbine, inclusive all means for extracting rotary energy from the thermal and kinetic energy of working fluid 101.

As shown in FIG. 9, floating sealing ring 310 has a cross-sectional shape generally in the form of an inverted "T," and may conveniently be divided into radially inner ring portion ("body") 310B and head portion ("head") 310H. While this shape may be preferred for strength, ease of installation, and removal, it will be understood by those skilled in the art that other shapes may be equally employed.

Figure 1A:
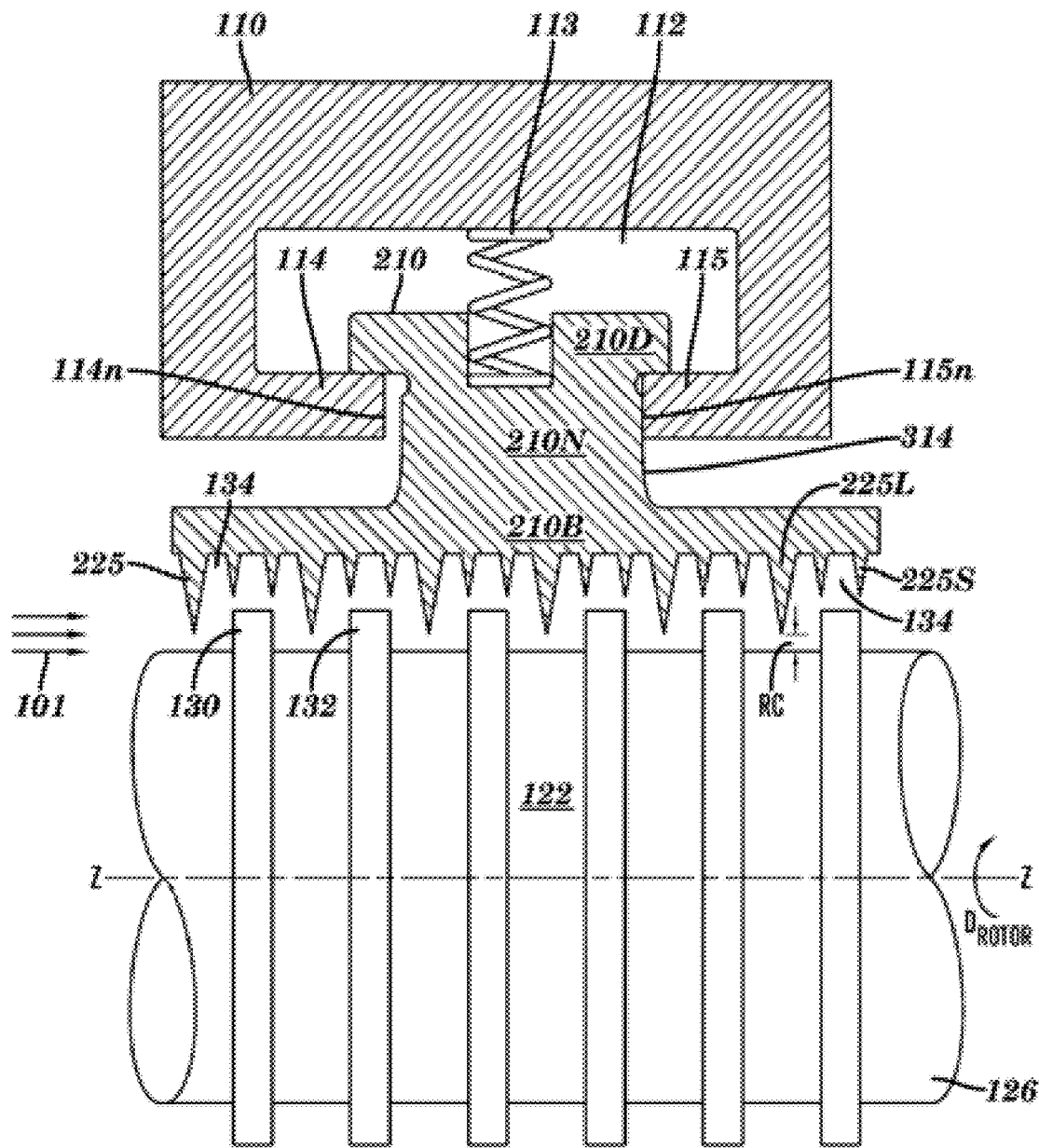
FIG. 1A is a partial longitudinal sectional view of a known labyrinth sealing device disposed about a rotating member of an exemplary turbine.
Figure 2:
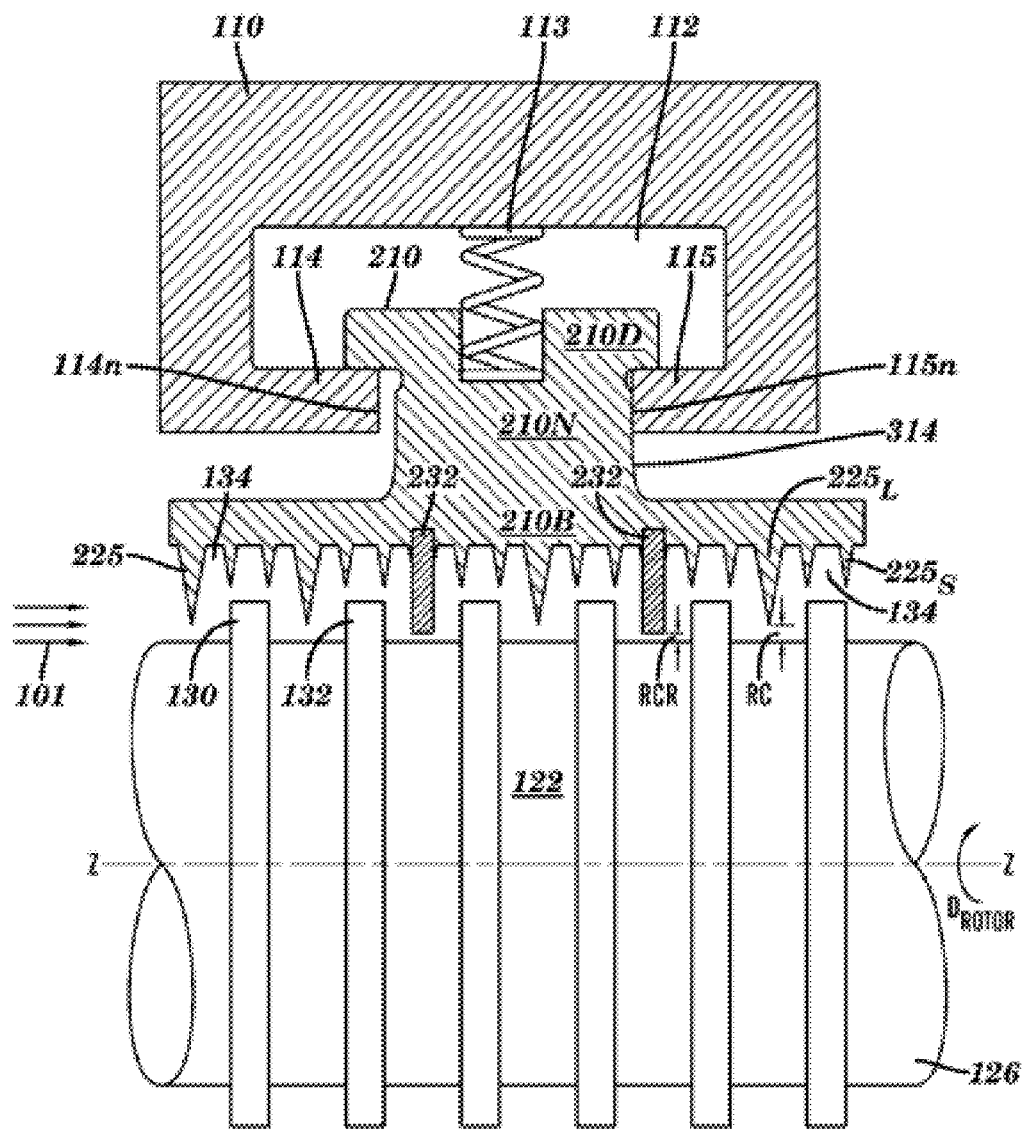
FIG. 2 is a partial longitudinal sectional view of a known labyrinth sealing device, disposed about a rotating member of an exemplary turbine that uses rubbing strips.

Unlike the conventional sealing rings described supra, floating sealing ring 310 is devoid of a dove tail, such as dove tail 210D appearing in FIGS. 1A and 2. The elimination of the dovetail from floating sealing ring 310 removes the means by which inward radial travel of a conventional sealing ring is arrested when it is disposed into a slot, such as slot 112, thereby allowing floating sealing ring 310 to freely seek a radial position relative to the outer surface 126 of rotating member 122, as more fully explained infra.

As shown in FIG. 9, head 310H is disposed in slot 112 of stationery member 110 so that its upstream lateral wall 313 and opposing downstream lateral wall 314 are respectively parallel to and oppose upstream lateral surface 114n of shoulder 114 of slot 112 and opposing downstream lateral surface 115n of opposing shoulder 115 of slot 112.

FIG. 9 shows a suspension device 360, which is representative of a set of suspension devices comprising at least one suspension device ("suspension device set"). In FIG. 9, suspension device set 360 is shown as disposed between upstream lateral surface 114n of slot 112 and upstream lateral wall 313 of body 310B.

In this disposition:

a) first force-transmitting surface 362A of set of suspension devices 360 makes slideable contact with upstream lateral surface of 114n of shoulder 114 of slot 112;

b) second force-transmitting surface 362B of suspension device set 360 is attached to upstream lateral wall 313 of head 310H; and, c) downstream lateral wall 314 of head 310H makes slideable contact with downstream lateral surface 115n of shoulder 115 of slot 112.

Figure 1B:
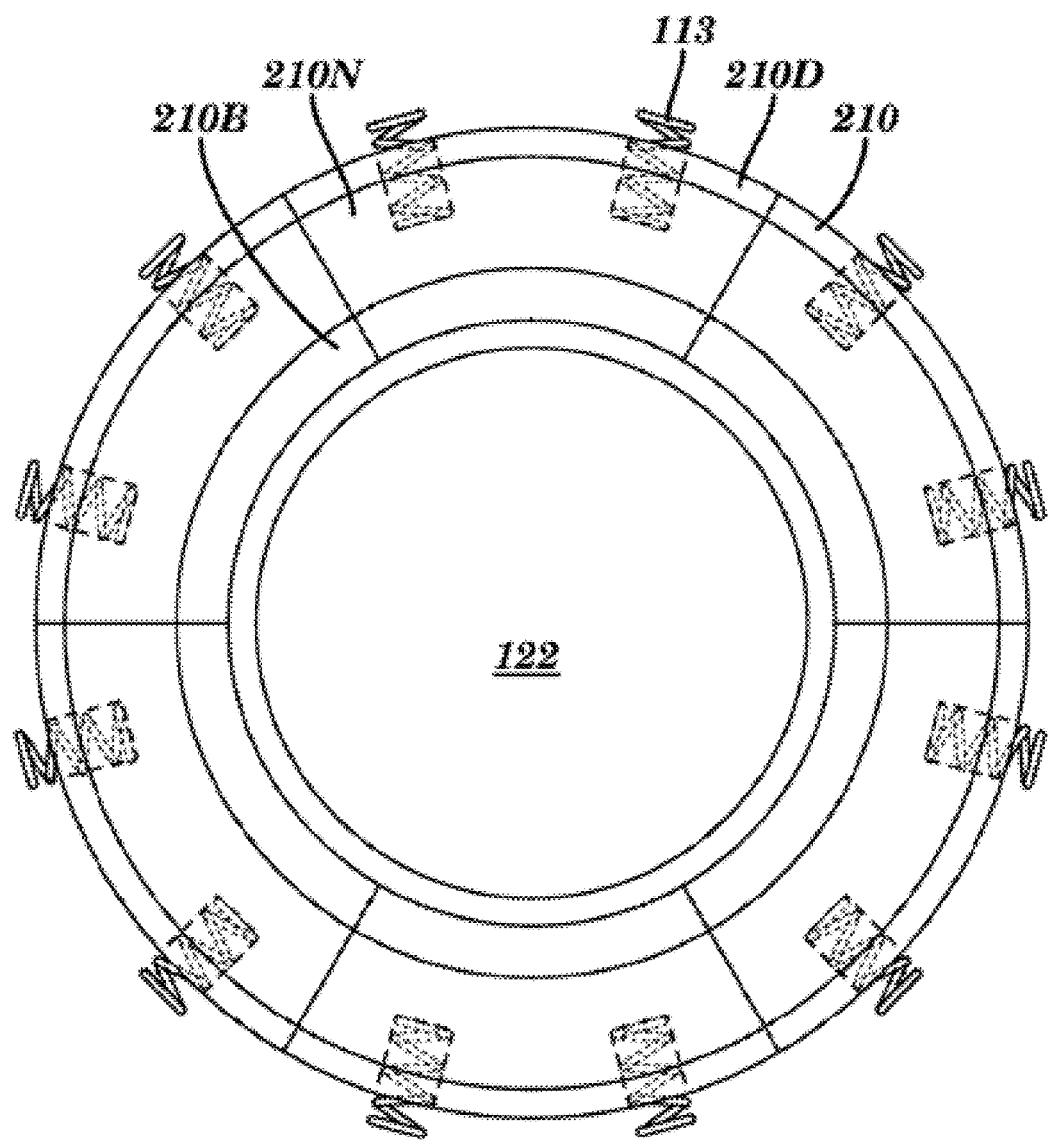
FIG. 1B is an axial cross-sectional view of a known labyrinth sealing device disposed about a rotating member of an exemplary turbine.

Unlike the conventional sealing rings described supra, in FIG. 9, slot 112 is devoid of an outer radially-oriented spring, such as spring 113 appearing in FIG. 1A and FIG. 1B.

The longitudinal cross sectional widths of head 310H are narrower than the longitudinal cross sectional widths at which necks 210N of conventional sealing rings 210 shown in FIG. 1A are manufactured, so that floating sealing ring 310 (or a segment thereof) with suspension device 360 in place (as shown in FIG. 9), may conveniently be inserted into the slot 112 (without the presence of a spring 113 shown in FIG. 1A) pre-existing in, for example, stationary turbine members that are adapted to receive conventional sealing rings, such as exemplary prior art sealing ring 210, shown in FIG. 1A.

In FIG. 9, body 310B of floating sealing ring 310 projects a throttling portion comprising a plurality of exemplary throttling elements 225, such as, for example, teeth, knife-edged teeth, strips, or sealing strips, known in the art. Throttling elements 225 may be etched in, extruded from, affixed to, or otherwise established on body 310B and are circumferentially coextensive with body 310B. Throttling elements 225 extend radially inward from body 310B toward outer surface 126 of rotating member 122. Throttling elements 225 may have different lengths, ranging between a shortest throttling element, such as throttling element 225S and a longest throttling element, such as throttling element 225L.

The radial clearance RC between longest throttling elements 225 and outer surface 126 of rotating member 122 has been defined as the radial linear distance between the longest throttling element, such as, for example, throttling element 225L and the outer surface 126 of rotating member 122. An annular solid of revolution ("clearance annular solid") corresponding to the radial clearance may be defined by rotating the radial line segment corresponding to the distance RC around central longitudinal axis Z.

As shown in FIG. 9, some throttling elements 225 of floating sealing ring 310 are correspondingly mounted opposite exemplary raised lands 130 and 132 on outer surface 126 of rotating member 122 to improve the sealing effectiveness of floating sealing ring 310. Throttling elements 225 are not in contact with surface 126 of rotating member 122 but extend to within very close proximity thereof, to maintain the clearance RC between the surface of rotating member 122 and throttling elements 225, providing an effective seal against steam flow.

Annular chambers 134 may be defined between individual throttling elements. In operation, throttling elements 225 serve to contain most of the working fluid that would otherwise escape through the space between rotating member 122 and stationary portion 110 of the turbine which surrounds it. The channel formed by each throttling element against an outer surface of the rotating member 122 results in a constriction through which the working fluid must pass.

Operationally, exemplary floating sealing ring 310 serves to contain most of the working fluid that would otherwise escape through the spaces between rotating member 122 and stationery surrounding structure 110 of a turbine. Additional floating sealing rings 310 may be provided in series along rotating member 122.

Floating sealing ring 310 is further comprised of at least one set of suspension devices, such as exemplary suspension device 360. Suspension device 360 is operationally coupled to a sensing device 330 by means of the ability of floating sealing ring 310 to mechanically transmit forces impacting upon sensing device 330.

Operationally, suspension device 360 generates antiparallel force vectors (represented by double-headed opaque arrow 363) respectively directed to upstream lateral surface 114n and downstream lateral surface 115n of slot 112, which force vectors are substantially parallel to central longitudinal axis Z of rotating member 122 and substantially maintain floating sealing ring 310 at radial clearance RC.

Suspension device 360 may be any device(s) that generates antiparallel forces (double-headed opaque arrow 363) that directly or indirectly maintains downstream lateral wall 314 in slideable contact with downstream lateral surface 115n.

Antiparallel forces may, for example, be physical, mechanical, electrical, magnetic, hydraulic or fluidic in nature. Mechanical antiparallel forces, may, for example, be exerted by a suitable spring, such as, for example, the leaf spring 360S shown in FIG. 4

The antiparallel forces generated by suspension device 360 also serve to maintain floating sealing ring 310 in an axial alignment with respect to rotating member 122.

As shown schematically in FIG. 9, suspension device 360 may transmit its antiparallel forces to opposing parallel force transmitting surfaces 362A and 362B. Force transmitting surface 362A makes slideable contact with upstream lateral wall 114n of shoulder 114 and force transmitting surface 362B is attached to upstream lateral wall 313 of head 310H.

In FIG. 9, sensing device 330 comprises one of more proximity strips, each having the general shape of an upright "T" when radially disposed with respect to rotating member 122, with an exposed length that exceeds the length of a longest throttling element. Each proximity strip is affixed to floating sealing ring 310 so as to be disposed within the clearance annular solid. A proximity strip may, for example, be comprised of Stelite® alloy, Nimonic® alloy, carbon or combinations thereof.

Sensing device 330 may either be provided as an integral extension of body 310B of floating sealing ring 310 or may be removeably attached as a replacement to any throttling element 225.

The material of sensing device 330 may be chosen to suit the particular needs of the application. The material of sensing device 330 should preferably:

a) have a low coefficient of friction; and, b) demonstrate superior wear characteristics; and, c) minimize damage to the rotating member during instances of contact.

Examples of possible material that could be used for the radial positioning device 330 include, without limitation, Stelite® alloy, Nimonic® alloy, carbon or combinations thereof. For example, sensing device 330 may be comprised of a Nimonic® alloy having an innermost surface comprising a layer of carbon.

Sensing device 330 is disposed with respect to rotating member 122 at a proximity radial clearance PRC that is smaller than the radial clearance RC. Consequently PRC defines an inner annular solid of revolution ("proximity solid annulus") that is contained within the clearance solid annulus defined by RC. If rotating member 122 intrudes upon the proximity solid annulus defined by PRC and threatens to encroach upon the clearance solid annulus defined by RC, its surface 126 comes into contact with the innermost surface of sensing device 330 and avoids contacting any throttlings 225.

Upon contact with sensing device 330, the radial component of the force imparted by this contact is transmitted through body 310B and head 310H of floating sealing ring 310, momentarily overcoming the antiparallel forces 363 exerted by the set of suspension devices 360 and slideably moving floating sealing ring 310 relative to lateral surfaces 114n and 115n, to a new position, such that the actual radial clearance is substantially maintained at the design radial clearance, without any damage to throttling elements 225 as a result of the transient changes in position.

When contact with proximity sensing device 330 ceases, the sealing ring is established at a new radial position relative to rotating member 122 at which rotating member 122 either no longer makes contact with proximity sensing device 330 or makes contact that is so "light" that the magnitude of any radial components of the force of contact is too low to move the floating sealing ring 310. Accordingly, floating sealing ring 310 either moves out of the way or is spared a "hard" rub.

While the invention has been disclosed in connection with the embodiments depicted herein, it will be apparent to one of ordinary skill in the art that various modifications and substitutions may be made to these embodiments without departing in any way from the scope of the invention as defined in the following claims.

I claim:

1. An apparatus for sealing a turbine against leakage of a working fluid, comprising:
   at least one radially displaceable sealing ring slidably suspended between at least one set of axially displacable suspension devices and a downstream lateral surface of at least one slot in a stationary member of a turbine,
      wherein the radially displaceable sealing ring is coaxially disposed about a rotating member of the turbine from a stationary member of the turbine, in at least one slot of the stationary member of the turbine, which slot has an upstream lateral surface and a downstream lateral surface, and the radially displaceable sealing ring is slideably suspended from the stationary member of the turbine by the suspension devices,
      wherein the at least one set of axially displaceable suspension devices apply antiparallel forces to the upstream lateral surface of a head of the radially displaceable sealing ring, and to the downstream lateral surface of the head of the radially displacable sealing ring,
      wherein the radially displaceable sealing ring is radially displaceable, so that the radially displaceable sealing ring undergoes radial displacements that are coupled to radial displacements of the rotating member, and so that a design radial clearance is substantially maintained without damage to the apparatus or the turbine.

2. The apparatus of claim 1, wherein the design radial clearance is substantially maintained without damage to the apparatus co-extensively with the operational life of the turbine.

3. A combination, comprising:
   a turbine, including a rotatable member and a stationary member, and the at least one apparatus for sealing the turbine of claim 1.

4. The apparatus of claim 1, wherein the radially displacable sealing ring comprises a body, having throttling elements, a head, and at least one sensing device coupled to the at least one set of suspension devices.

5. The apparatus of claim 4, wherein the sensing device is made of a material having a low coefficient of friction.

6. The apparatus of claim 4, wherein the material of the sensing device demonstrates superior wear characteristics.

7. The apparatus of claim 4, wherein the material of the sensing device minimizes damage to the rotating member during instances of contact.

8. The apparatus of claim 5, wherein the low coefficient of friction material is selected from the group consisting of Stelite® alloy, Nimonic® alloy, carbon and combinations thereof.

9. An apparatus for sealing a turbine against leakage of a working fluid comprising:
   at least one floating sealing ring, slideably disposed in at least one slot of a stationary member of the turbine, which slot has an upstream lateral surface and a downstream lateral surface, the floating sealing ring comprising a body having throttling elements, a head, and at least one sensing device coupled to at least one set of suspension devices,
      wherein the set of suspension devices are disposed between the upstream lateral surface of the slot of the stationary member of the turbine and an upstream lateral wall of the head of the sealing ring,
      wherein the set of suspension devices suspends the floating sealing ring coaxially about a rotatable member of the turbine at a design radial clearance; and, substantially maintains the floating sealing ring at the design radial clearance without damage to the throttling elements, whenever the sensing device contacts the rotating member,
      wherein the at least one floating sealing ring is radially displaceable, so that the at least one floating sealing ring undergoes radial displacements that are coupled to radial displacements of the rotatable member, and so that a design radial clearance is substantially maintained without damage to the apparatus or the turbine.

10. The apparatus of claim 9, wherein the design radial clearance is substantially maintained without damage to the throttling elements co-extensively with the operational life of the turbine.

11. The apparatus of claim 9, wherein a cross section of the floating sealing ring generally has the shape of an inverted T, when the floating sealing ring is radially oriented with respect to a central longitudinal axis of the rotating member of the turbine.

12. The apparatus of claim 9, wherein the floating sealing ring sealing ring is devoid of a dovetail.

13. The apparatus of claim 9, wherein the at least one set of suspension devices comprises a set of springs.

14. The apparatus of claim 13, wherein the springs comprise leaf springs.

15. The apparatus of claim 9, wherein the at least one set of suspension devices comprises any devices that generate opposing antiparallel forces substantially orthogonal to a longitudinal axis of the rotating member.

16. The apparatus of claim 15, wherein the opposing antiparallel forces are respectively transmitted through a first force-transmitting surface and a second force-transmitting surface.

17. The apparatus of claim 16 wherein the antiparallel forces, directly or indirectly, maintain an upstream lateral wall of the head in slideable contact with the upstream lateral surface of the slot.

18. The apparatus of claim 16 wherein the antiparallel forces directly or indirectly maintain a downstream lateral wall of the head in slideable contact with the downstream lateral surface of the slot.

19. The apparatus of claim 16, wherein the antiparallel forces, directly or indirectly, maintain a downstream lateral wall of the head in slideable contact with the downstream lateral surface of the slot and maintain an upstream lateral wall of the head in slideable contact with the upstream lateral surface of the slot.

20. The apparatus of claim 15, wherein the opposing antiparallel forces comprise physical, mechanical, electrical, magnetic, gravitational, hydraulic, or fluidic forces.

21. The apparatus of claim 15, wherein the opposing antiparallel forces suspend the floating sealing ring at the design radial clearance.

22. The apparatus of claim 21, wherein, upon contacting the rotating member, the sensing device transmits a radial component of the force of the contact through the floating sealing ring sealing ring, momentarily overcoming the antiparallel forces exerted by the at least one set of suspension devices and slideably moving the floating sealing ring sealing ring to a new position, such that its actual radial clearance is substantially maintained at the design radial clearance, without any damage to throttling elements.

23. The apparatus of claim 9, wherein the sensing device is disposed among the throttling elements.

24. The apparatus of claim 9, wherein the sensing device comprises an integral extension of the body arising among the throttling elements.

25. The apparatus of claim 9, wherein the sensing device is removeably attachable among the throttling elements.

26. The apparatus of claim 9, wherein the sensing device comprises a removeable replacement of a throttling element.

27. The apparatus of claim 9, wherein the sensing device is comprised of a proximity strip when the sensing device is radially disposed with respect to the rotating member having an exposed length that exceeds the length of a longest throttling element.

28. The apparatus of claim 27, wherein the proximity strip is in the general shape of an upright "T".

29. The apparatus of claim 27, wherein the proximity strip is disposed among the throttling elements.

30. The apparatus of claim 27, wherein the proximity strip comprises an integral extension of the body arising among the throttling elements.

31. The apparatus of claim 27, wherein the proximity strip is removeably attachable among the throttling elements.

32. The apparatus of claim 27, wherein the proximity strip comprises a removeable replacement of a throttling element.

33. The apparatus of claim 27, wherein the proximity strip is selected from the group consisting of Stelite® alloy, Nimonic® alloy, carbon, and combinations thereof.

34. The apparatus of claim 9, wherein the floating sealing ring comprises at least two floating ring segments, the floating ring segments being fixedly fastened to one another so as to form a mechanically unitary and continuous floating sealing ring, each floating ring segment comprising a body segment having means for fixedly joining it to another floating ring segment, and throttling elements, a head segment, and at least one sensing device coupled to at least one set of suspension devices, wherein the set of suspension devices suspends each floating sealing ring segment coaxially about the rotatable member of the turbine at a design radial clearance and substantially maintains each floating sealing segment at the design radial clearance without damage to the throttling elements, whenever the sensing device contacts the rotating member.

35. The apparatus of claim 34, wherein the design radial clearance is substantially maintained without damage to the throttling elements, co-extensively with the operational life of the turbine.

36. The apparatus of claim 34, wherein a cross section of the floating sealing ring segment generally has the shape of an inverted T, when the floating sealing ring segment is radially oriented respect to a central longitudinal axis of the rotating member of the turbine.

37. The apparatus of claim 34, wherein the means for fixedly fastening one floating ring segment to another floating ring segment comprises disposing a fastening device in one or more sets of paired alignment holes drilled into complementary positions on matched apposing faces of the sealing ring segments.

38. The apparatus of claim 34, wherein the floating ring segment is devoid of a dovetail.

39. The apparatus of claim 34, wherein the set of suspension devices comprises a set of springs.

40. The apparatus of claim 39, wherein the springs comprise leaf springs.

41. The apparatus of claim 34, wherein the set of suspension devices comprises any devices that generate opposing antiparallel forces substantially parallel to a longitudinal axis of the rotating member.

42. The apparatus of claim 41, wherein the opposing antiparallel forces are respectively transmitted through a first force-transmitting surface and a second force-transmitting surface.

43. The apparatus of claim 42, wherein the antiparallel forces, directly or indirectly, maintain an upstream lateral wall of the head segment in slideable contact with the upstream lateral surface of the slot.

44. The apparatus of claim 42, wherein the antiparallel forces directly or indirectly maintain a downstream lateral wall of the head segment in slideable contact with the downstream lateral surface of the slot.

45. The apparatus of claim 42, wherein the antiparallel forces, directly or indirectly, maintain a downstream lateral wall of the head segment in slideable contact with the downstream lateral surface of the slot and maintain an upstream lateral wall of the head segment in slideable contact with the upstream lateral surface of the slot.

46. The apparatus of claim 41, wherein the opposing antiparallel forces comprise physical, mechanical, electrical, magnetic, gravitational, hydraulic, or fluidic forces.

47. The apparatus of claim 41, wherein the opposing antiparallel forces suspend the floating sealing ring segment at the design radial clearance.

48. The apparatus of claim 41, wherein, upon contacting the rotating member, the sensing device transmits a radial component of the force of the contact through the floating sealing ring segment, momentarily overcoming the antiparallel forces exerted by the set of suspension devices and slideably moving the floating sealing ring segment to a new position, such that its actual radial clearance is maintained at the design radial clearance, without any damage to throttling elements.

49. The apparatus of claim 34, wherein the at least one sensing device is disposed among the throttling elements.

50. The apparatus of claim 34, wherein the at least one sensing device comprises an integral extension of the body segment arising among the throttling elements.

51. The apparatus of claim 34, wherein the at least one sensing device is removeably attachable among the throttling elements.

52. The apparatus of claim 34, wherein the at least one sensing device-comprises a removeable replacement of a throttling element.

53. The apparatus of claim 34, wherein the at least one sensing device is comprised of a proximity strip in the general shape of an upright "T" when radially disposed with respect to the rotating member having an exposed length that exceeds the length of a longest throttling element.

54. The apparatus of claim 53, wherein the proximity strip is disposed among the throttling elements.

55. The apparatus of claim 53, wherein the proximity strip comprises an integral extension of the body arising among the throttling elements.

56. The apparatus of claim 53, wherein the proximity strip is removeably attachable among the throttling elements.

57. The apparatus of claim 53, wherein the proximity strip comprises a removeable replacement of a throttling element.

58. The apparatus of claim 53, wherein the proximity strip is selected from the group consisting of Stelite® alloy, Nimonic® alloy, carbon and combinations thereof.

59. A combination, comprising: a turbine, including a rotatable member and a stationary member,
wherein the stationary member comprises at least one slot, and the apparatus for sealing a turbine against leakage of a working fluid of claim 9.

60. The combination of claim 59, wherein the floating sealing ring comprises: floating ring segments, fixedly fastened to one another so as to form a mechanically unitary and continuous floating sealing ring, each floating ring segment comprising a body segment having means for fixedly joining it to another floating ring segment, and throttling elements, a head segment, and at least one sensing device coupled to at least one set of suspension devices, wherein the set of suspension devices suspends each floating sealing ring segment coaxially about the rotatable member of the turbine at a design radial clearance and substantially maintains each floating sealing segment at the design radial clearance without damage to the throttling elements, whenever the sensing device contacts the rotating member.

61. An apparatus for sealing a turbine against leakage of a working fluid, comprising:
a plurality of coaxial and linearly arrayed floating sealing rings, each floating sealing ring comprising a body having throttling elements, a head, which is devoid of a dovetail shape and at least one sensing device coupled to at least one set of suspension devices,
wherein the set of suspension devices suspends each floating sealing ring coaxially about a rotatable member of the turbine at a design radial clearance and substantially maintains the sealing ring at the design radial clearance without damage to the throttling elements, whenever the sensing device contacts the rotating member
wherein the floating sealing ring is radially displaceable, so that the floating sealing ring undergoes radial displacements that are coupled to radial displacements of the rotating member, and so that a design radial clearance is substantially maintained without damage to the apparatus or the turbine.

62. The apparatus of claim 61, wherein the design radial clearance is substantially maintained without damage to the throttling elements, co-extensively with the operational life of the turbine.

63. The apparatus of claim 61, wherein a cross section of the floating sealing rings generally has the shape of an inverted T, when the floating sealing rings are radially oriented respect to a central longitudinal axis of the rotating member of the turbine.

64. The apparatus of claim 61, wherein the floating sealing ring is devoid of a dovetail.

65. The apparatus of claim 61, wherein the set of suspension devices comprises a set of springs.

66. The apparatus of claim 65, wherein the springs comprise leaf springs.

67. The apparatus of claim 61, wherein the set of suspension devices comprises any devices that generate opposing antiparallel forces substantially parallel to a longitudinal axis of the rotating member.

68. The apparatus of claim 67, wherein the opposing antiparallel forces are respectively transmitted through a first force-transmitting surface and a second force-transmitting surface.

69. The apparatus of claim 68, wherein the antiparallel forces, directly or indirectly, maintain an upstream lateral wall of the head in slideable contact with the upstream lateral surface of the slot.

70. The apparatus of claim 68, wherein the antiparallel forces directly or indirectly maintain a downstream lateral wall of the head in slideable contact with the downstream lateral surface of the slot.

71. The apparatus of claim 68, wherein the antiparallel forces, directly or indirectly, maintain a downstream lateral wall of the head in slideable contact with the downstream lateral surface of the slot and maintain an upstream lateral wall of the head in slideable contact with the upstream lateral surface of the slot.

72. The apparatus of claim 67 wherein the opposing antiparallel forces comprise physical, mechanical, electrical, magnetic, gravitational, hydraulic, or fluidic forces.

73. The apparatus of claim 67, wherein the opposing antiparallel forces suspend the floating sealing ring at the design radial clearance.

74. The apparatus of claim 67, wherein, upon contacting the rotating member, the sensing device transmits a radial component of the force of the contact through the floating sealing ring, momentarily overcoming the antiparallel forces exerted by the set of suspension devices and slideably moving the floating sealing ring to a new position, such that its actual radial clearance is substantially maintained at the design radial clearance, without any damage to throttling elements.

75. The apparatus of claim 61, wherein the sensing device is disposed among the throttling elements.

76. The apparatus of claim 61, wherein the sensing device comprises an integral extension of the body arising among the throttling elements.

77. The apparatus of claim 61, wherein the sensing device is removeably attachable among the throttling elements.

78. The apparatus of claim 61, wherein the sensing device comprises a removeable replacement of a throttling element.

79. The apparatus of claim 61, wherein the sensing device is comprised of a proximity strip in the general shape of an upright "T" when radially disposed with respect to the rotating member having an exposed length that exceeds the length of a longest throttling element.

80. The apparatus of claim 79, wherein the proximity strip is disposed among the throttling elements.

81. The apparatus of claim 79, wherein the proximity strip comprises an integral extension of the body arising among the throttling elements.

82. The apparatus of claim 79, wherein the proximity strip is removeably attachable among the throttling elements.

83. The apparatus of claim 79, wherein the proximity strip comprises a removeable replacement of a throttling element.

84. The apparatus of claim 79, wherein the proximity strip is selected from the group consisting of Stelite® alloy, Nimonic® alloy, carbon and combinations thereof.

85. A combination, comprising:
a turbine, including a rotatable member and a stationary member, wherein the stationary member comprises at least one slot, and
the apparatus for sealing a turbine of claim 61.

86. A method for producing a floating sealing ring against leakage of a working fluid from a turbine having a stationary member and a rotating member, the sealing ring being slideably disposable in at least one slot of the stationary member, which slot has an upstream lateral surface and a downstream lateral surface, the method comprising:
providing a sealing ring comprising a head and a body having throttling elements extending radially therefrom;

providing at least one set of suspension devices that suspend the sealing ring at a design radial clearance, wherein the set of suspension devices are disposed between the upstream lateral surface of the slot of the stationary member of the turbine and an upstream lateral wall of the head of the sealing ring;

disposing a sensing device among the throttling elements;

coupling the sensing device to the set of suspension devices such that the set of suspension devices maintains the sealing ring at the design radial clearance without damage to the throttling elements, whenever the sensing device contacts the rotating member, wherein the at least one floating sealing ring is radially displaceable, so that the at least one floating sealing ring undergoes radial displacements that are coupled to radial displacements of the rotatable member, and so that a design radial clearance is substantially maintained without damage to the apparatus or the turbine.

87. The method of claim 86, wherein the set of suspension devices comprises a set of springs.

88. The method of claim 87 wherein the set of springs comprises leaf springs.

89. The method of claim 86, wherein the set of suspension devices comprises any device that generates opposing antiparallel forces that are substantially orthogonal to a longitudinal axis of the rotating member.

90. The method of claim 89, wherein the opposing antiparallel forces are respectively transmitted through a first force-transmitting surface and a second force-transmitting surface of the set of suspending device.

91. The method of claim 90, wherein the antiparallel forces, directly or indirectly, maintain an upstream lateral wall of the head in slideable contact with the upstream lateral surface of the slot.

92. The method of claim 90, wherein the antiparallel forces directly or indirectly maintain a downstream lateral wall of the head in slideable contact with the downstream lateral surface of the slot.

93. The method of claim 90, wherein the antiparallel forces, directly or indirectly, maintain a downstream lateral wall of the head in slideable contact with the downstream lateral surface of the slot and maintain an upstream lateral wall of the head in slideable contact with the upstream lateral surface of the slot.

94. The method of claim 89, wherein the opposing antiparallel forces comprise physical, mechanical, electrical, magnetic, gravitational, hydraulic, or fluidic forces.

95. The method of claim 89, wherein the opposing antiparallel forces suspend the floating sealing ring at the design radial clearance.

96. The method of claim 89, wherein, upon contacting the rotating member, the sensing device transmits a radial component of the force of the contact through the floating sealing ring, momentarily overcoming the antiparallel forces exerted by the set of suspension devices and slideably moving the floating sealing ring to a new position, such that its actual radial clearance is substantially maintained at the design radial clearance, without any damage to throttling elements.

97. The method of claim 86, wherein the sensing device comprises an integral extension of the body arising among the throttling elements.

98. The method of claim 86, wherein the sensing device is removeably attachable among the throttling elements.

99. The method of claim 86, wherein the sensing device comprises a removeable replacement of a throttling element.

100. The method of claim 86, wherein the sensing device is comprised of a proximity strip in the general shape of an upright "T" when radially disposed with respect to the rotating member having an exposed length that exceeds the length of a longest throttling element.

101. The method of claim 100, wherein the proximity strip is disposed among the throttling elements.

102. The method of claim 100, wherein the proximity strip comprises an integral extension of the body arising among the throttling elements.

103. The method of claim 100, wherein the proximity strip is removeably attachable among the throttling elements.

104. The method of claim 100, wherein the proximity strip comprises a removeable replacement of a throttling element.

105. The method of claim 100, wherein the proximity strip is selected from the group consisting of Stelite® alloy, Nimonic® alloy, carbon and combinations thereof.

106. A method for sealing a turbine against leakage of a working fluid, the turbine having a rotating member and a stationary member having at least one slot with an upstream lateral surface and a downstream lateral surface, the method comprising:

defining a central longitudinal axis about which the rotating member rotates;

defining a design radial clearance between a longest throttling element of a floating sealing ring and an outer surface of the rotating member;

slideably disposing a floating sealing ring comprising a body having throttling elements, a head which is devoid of a dovetail shape, and at least one sensing device coupled to at least one set of suspension devices, in the slot of the stationary member thereby coaxially suspending the floating sealing ring at the design radial clearance by means of the set of suspension devices;

maintaining the floating sealing ring at the design radial clearance;

substantially restoring the floating sealing ring to the design radial clearance without damage to any of its throttling elements, whenever the sensing device contacts the rotating member, wherein the set of suspension devices comprises any device that generates opposing antiparallel forces that are substantially parallel to a longitudinal axis of the rotating member, and wherein, upon contacting the rotating member, the sensing device transmits a radial component of the force of the contact through the floating sealing ring, momentarily overcoming the antiparallel forces exerted by the set of suspension devices and slideably moving the floating sealing ring to a new position, such that its actual radial clearance is substantially maintained at the design radial clearance, without any damage to throttling elements.

107. The method of claim 106, wherein the set of suspension devices comprises a set of springs.

108. The method of claim 107 wherein the set of springs comprises leaf springs.

109. The method of claim 106, wherein the opposing antiparallel forces are respectively transmitted through a first force-transmitting surface and a second force-transmitting surface of the set of suspending devices.

110. The method of claim 109, wherein the antiparallel forces, directly or indirectly, maintain an upstream lateral wall of the head in slideable contact with the upstream lateral surface of the slot.

111. The method of claim 109, wherein the antiparallel forces directly or indirectly maintain a downstream lateral wall of the head in slideable contact with the downstream lateral surface of the slot.

112. The method of claim 109, wherein the antiparallel forces, directly or indirectly, maintain a downstream lateral wall of the head in slideable contact with the downstream lateral surface of the slot and maintain an upstream lateral wall of the head in slideable contact with the upstream lateral surface of the slot.

113. The method of claim 106, wherein the opposing antiparallel forces comprise physical, mechanical, electrical, magnetic, gravitational, hydraulic, or fluidic forces.

114. The method of claim 106, wherein the opposing antiparallel forces suspend the sealing ring at the design radial clearance.

115. The method of claim 106, wherein the sensing device comprises an integral extension of the body arising among the throttling elements.

116. The method of claim 106, wherein the sensing device is removeably attachable among the throttling elements.

117. The method of claim 106, wherein the sensing device comprises a removeable replacement of a throttling element.

118. The method of claim 106, wherein the sensing device is comprised of a proximity strip in the general shape of an upright "T" when radially disposed with respect to the rotating member having an exposed length that exceeds the length of a longest throttling element.

119. The method of claim 118, wherein the proximity strip is disposed among the throttling elements.

120. The method of claim 118, wherein the proximity strip comprises an integral extension of the body arising among the throttling elements.

121. The method of claim 118, wherein the proximity strip is removeably attachable among the throttling elements.

122. The method of claim 118, wherein the proximity strip comprises a removeable replacement of a throttling element.

123. The method of claim 118, wherein the proximity strip is selected from the group consisting of Stelite® alloy, Nimonic® alloy, carbon and combinations thereof.

124. The method of claim 106, wherein the head is disposed within the slot, such that an upstream lateral wall of the head opposes the upstream lateral surface of the slot and a downstream lateral wall of the head opposes the downstream lateral surface of the slot.

125. The method of claim 109, wherein the set of suspension devices is disposed between the upstream lateral surface of the slot and the upstream lateral wall of the head, such that the first force-transmitting surface of the set of suspension devices makes slideable contact with the upstream lateral surface of the slot; the second force-transmitting surface of the set of suspension devices is coincident with the upstream lateral wall of the head; and, the downstream lateral wall of the head makes slideable contact with downstream lateral surface of the slot.

126. A method for suspending a radially displacable sealing ring, comprising:
providing at least one radially displaceable sealing ring slidably suspended between at least one set of axially displacable suspension devices and a downstream lateral surface of at least one slot in a stationary member of a turbine,
disposing a sensing device among the throttling elements;
coupling the sensing device to the set of suspension devices such that the set of suspension devices maintains the sealing ring at the design radial clearance without damage to the throttling elements, whenever the sensing device contacts the rotating member.

127. The method of claim 126, wherein the sensing device is made of a material having a low coefficient of friction.

128. The method of claim 127, wherein the material of the sensing device demonstrates superior wear characteristics.

129. The method of claim 127, wherein the material of the sensing device minimizes damage to the rotating member during instances of contact.

130. The method of claim 127, wherein the low coefficient of friction material is selected from the group consisting of Stelite® alloy, Nimonic® alloy, carbon and combinations thereof.

131. An apparatus for sealing a turbine against leakage of a working fluid comprising:
at least one floating sealing ring, slideably disposed in at least one slot of a stationary member of the turbine, which slot has an upstream lateral surface and a downstream lateral surface, the floating sealing ring comprising a body having throttling elements, a head, and at least one sensing device coupled to at least one set of suspension devices,
wherein the set of suspension devices are disposed between the upstream lateral surface of the slot of the stationary member of the turbine and an upstream lateral wall of the head of the sealing ring,
wherein the set of suspension devices suspends the floating sealing ring coaxially about a rotatable member of the turbine at a design radial clearance; and, substantially maintains the floating sealing ring at the design radial clearance without damage to the throttling elements, whenever the sensing device contacts the rotating member,
wherein the set of suspension devices comprises devices that generate opposing antiparallel forces substantially parallel to a longitudinal axis of the rotating member
wherein the opposing antiparallel forces suspend the floating sealing ring at the design radial clearance, and
wherein, upon contacting the rotating member, the sensing device transmits a radial component of the force of the contact through the floating sealing ring, momentarily overcoming the antiparallel forces exerted by the set of suspension devices and slideably moving the floating sealing ring to a new position, such that its actual radial clearance is substantially maintained at the design radial clearance, without any damage to throttling elements.

132. A combination, comprising:
a turbine, including a rotatable member and a stationary member,
wherein the stationary member comprises at least one slot:
a plurality of coaxial and linearly arrayed floating sealing rings, each floating sealing ring comprising:
a body having throttling elements;
a head, which is devoid of a dovetail shape; and
at least one sensing device coupled to at least one set of suspension devices,
wherein the set of suspension devices suspends each floating sealing ring coaxially about a rotatable member of the turbine at a design radial clearance and substantially maintains the sealing ring at the design radial clearance without damage to the throttling elements, whenever the sensing device contacts the rotating member.

133. An apparatus for sealing a turbine against leakage of a working fluid, comprising:
at least one floating sealing ring, slideably disposed in at least one slot of a stationary member of the turbine, which slot has an upstream lateral surface and a downstream lateral surface,
the floating sealing ring comprising:
a body having throttling elements;
a head; and
at least one sensing device coupled to at least one set of suspension devices,
wherein the set of suspension devices are disposed between the upstream lateral surface of the slot of the stationary member of the turbine and an upstream lateral wall of the head of the sealing ring,
wherein the set of suspension devices suspends the floating sealing ring coaxially about a rotatable member of the turbine at a design radial clearance; and, substantially maintains the floating sealing ring at the design radial clearance without damage to the throttling elements, whenever the sensing device contacts the rotating member, and
wherein the sensing device is comprised of a proximity strip in the general shape of an upright "T" when radially disposed with respect to the rotating member having an exposed length that exceeds the length of a longest throttling element.

134. An apparatus for sealing a turbine against leakage of a working fluid, comprising:
a plurality of coaxial and linearly arrayed floating sealing rings, each floating sealing ring comprising a body having throttling elements, a head, which is devoid of a dovetail shape and at least one sensing device coupled to at least one set of suspension devices,
wherein the set of suspension devices suspends each floating sealing ring coaxially about a rotatable member of the turbine at a design radial clearance and substantially maintains the sealing ring at the design radial clearance without damage to the throttling elements, whenever the sensing device contacts the rotating member, and
wherein the sensing device comprises a removeable replacement of a throttling element.

135. A combination, comprising:
a turbine, including a rotatable member and a stationary member,
wherein the stationary member comprises at least one slot, and
an apparatus for sealing a turbine against leakage of a working fluid, comprising:
at least one floating sealing ring, slideably disposed in at least one slot of a stationary member of the turbine, which slot has an upstream lateral surface and a downstream lateral surface, the floating sealing ring comprising a body having throttling elements, a head, and at least one sensing device coupled to at least one set of suspension devices,
wherein the set of suspension devices are disposed between the upstream lateral surface of the slot of the stationary member of the turbine and an upstream lateral wall of the head of the sealing ring,
wherein the set of suspension devices suspends the floating sealing ring coaxially about a rotatable member of the turbine at a design radial clearance; and, substantially maintains the floating sealing ring at the design radial clearance without damage to the throttling elements, whenever the sensing device contacts the rotating member,
wherein the floating sealing ring comprises floating ring segments, fixedly fastened to one another so as to form a mechanically unitary and continuous floating sealing ring, each floating ring segment comprising:
a body segment having means for fixedly joining it to another floating ring segment;
throttling elements;
a head segment; and
at least one sensing device coupled to at least one set of suspension devices, and
wherein the set of suspension devices suspends each floating sealing ring segment coaxially about the rotatable member of the turbine at a design radial clearance and substantially maintains each floating sealing segment at the design radial clearance without damage to the throttling elements, whenever the sensing device contacts the rotating member.

136. A method for producing a floating sealing ring against leakage of a working fluid from a turbine having a stationary member and a rotating member, the sealing ring being slideably disposable in at least one slot of the stationary member, which slot has an upstream lateral surface and a downstream lateral surface, the method comprising:
providing a sealing ring comprising a head and a body having throttling elements extending radially therefrom;
providing at least one set of suspension devices that suspend the sealing ring at a design radial clearance, wherein the set of suspension devices are disposed between the upstream lateral surface of the slot of the stationary member of the turbine and an upstream lateral wall of the head of the sealing ring;
disposing a sensing device among the throttling elements;
coupling the sensing device to the set of suspension devices such that the set of suspension devices maintains the sealing ring at the design radial clearance without damage to the throttling elements, whenever the sensing device contacts the rotating member,
wherein the set of suspension devices comprises any device that generates opposing antiparallel forces that are substantially orthogonal to a longitudinal axis of the rotating member,
wherein, upon contacting the rotating member, the sensing device transmits a radial component of the force of the contact through the floating sealing ring, momentarily overcoming the antiparallel forces exerted by the set of suspension devices and slideably moving the floating sealing ring to a new position, such that its actual radial clearance is substantially maintained at the design radial clearance, without any damage to throttling elements.

137. A method for producing a floating sealing ring against leakage of a working fluid from a turbine having a stationary member and a rotating member, the sealing ring being slideably disposable in at least one slot of the stationary member, which slot has an upstream lateral surface and a downstream lateral surface, the method comprising:
providing a sealing ring comprising a head and a body having throttling elements extending radially therefrom;
providing at least one set of suspension devices that suspend the sealing ring at a design radial clearance, wherein the set of suspension devices are disposed between the upstream lateral surface of the slot of the stationary member of the turbine and an upstream lateral wall of the head of the sealing ring;
disposing a sensing device among the throttling elements;

coupling the sensing device to the set of suspension devices such that the set of suspension devices maintains the sealing ring at the design radial clearance without damage to the throttling elements, whenever the sensing device contacts the rotating member, wherein the sensing device comprises an integral extension of the body arising among the throttling elements.

138. A method for producing a floating sealing ring against leakage of a working fluid from a turbine having a stationary member and a rotating member, the sealing ring being slideably disposable in at least one slot of the stationary member, which slot has an upstream lateral surface and a downstream lateral surface, the method comprising:

providing a sealing ring comprising a head and a body having throttling elements extending radially therefrom;

providing at least one set of suspension devices that suspend the sealing ring at a design radial clearance, wherein the set of suspension devices are disposed between the upstream lateral surface of the slot of the stationary member of the turbine and an upstream lateral wall of the head of the sealing ring;

disposing a sensing device among the throttling elements;

coupling the sensing device to the set of suspension devices such that the set of suspension devices maintains the sealing ring at the design radial clearance without damage to the throttling elements, whenever the sensing device contacts the rotating member, wherein the sensing device is comprised of a proximity strip in the general shape of an upright "T" when radially disposed with respect to the rotating member having an exposed length that exceeds the length of a longest throttling element.

139. A method for sealing a turbine against leakage of a working fluid, the turbine having a rotating member and a stationary member having at least one slot with an upstream lateral surface and a downstream lateral surface, the method comprising:

defining a central longitudinal axis about which the rotating member rotates;

defining a design radial clearance between a longest throttling element of a floating sealing ring and an outer surface of the rotating member;

slideably disposing a floating sealing ring comprising a body having throttling elements, a head which is devoid of a dovetail shape, and at least one sensing device coupled to at least one set of suspension devices, in the slot of the stationary member thereby coaxially suspending the floating sealing ring at the design radial clearance by means of the set of suspension devices;

maintaining the floating sealing ring at the design radial clearance;

substantially restoring the floating sealing ring to the design radial clearance without damage to any of its throttling elements, whenever the sensing device contacts the rotating member, wherein the sensing device comprises a removeable replacement of a throttling element.

140. A method for sealing a turbine against leakage of a working fluid, the turbine having a rotating member and a stationary member having at least one slot with an upstream lateral surface and a downstream lateral surface, the method comprising:

defining a central longitudinal axis about which the rotating member rotates;

defining a design radial clearance between a longest throttling element of a floating sealing ring and an outer surface of the rotating member;

slideably disposing a floating sealing ring comprising a body having throttling elements, a head which is devoid of a dovetail shape, and at least one sensing device coupled to at least one set of suspension devices, in the slot of the stationary member thereby coaxially suspending the floating sealing ring at the design radial clearance by means of the set of suspension devices;

maintaining the floating sealing ring at the design radial clearance;

substantially restoring the floating sealing ring to the design radial clearance without damage to any of its throttling elements, whenever the sensing device contacts the rotating member, wherein the sensing device is comprised of a proximity strip in the general shape of an upright "T" when radially disposed with respect to the rotating member having an exposed length that exceeds the length of a longest throttling element.

* * * * *